US007724971B2

(12) United States Patent
Huang et al.

(10) Patent No.: US 7,724,971 B2

(45) Date of Patent: May 25, 2010

(54) IMAGE PROCESSING METHOD FOR A TFT LCD

(75) Inventors: Juin-Ying Huang, Taipei (TW); Wen-Tse Tseng, Taipei (TW); Chien-Hsun Cheng, Taipei (TW); Shih-Sung Wen, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 12/181,840

(22) Filed: Jul. 29, 2008

(65) Prior Publication Data

US 2008/0304709 A1 Dec. 11, 2008

Related U.S. Application Data

(62) Division of application No. 10/963,636, filed on Oct. 14, 2004, now abandoned.

(30) Foreign Application Priority Data

Apr. 26, 2004 (TW) .............................. 93111657 A

(51) Int. Cl.
*G06K 9/36* (2006.01)

(52) U.S. Cl. ....................... 382/236; 382/107; 382/232; 345/204

(58) Field of Classification Search ................. 382/107, 382/236; 345/204
See application file for complete search history.

(56) References Cited

U.S. PATENT DOCUMENTS

| | | | | |
|---|---|---|---|---|
| 4,539,594 | A * | 9/1985 | Illetschko | 348/620 |
| 4,727,506 | A | 2/1988 | Fling | |
| 5,081,450 | A * | 1/1992 | Lucas et al. | 345/615 |
| 6,507,350 | B1 | 1/2003 | Wilson | |
| 6,870,945 | B2 * | 3/2005 | Schoepflin et al. | 382/107 |
| 2002/0149574 | A1 * | 10/2002 | Johnson et al. | 345/204 |

* cited by examiner

*Primary Examiner*—Vikkram Bali
*Assistant Examiner*—Daniel Zeilberger

(57) ABSTRACT

Image compression, decompression and motion detection methods are described. Two temporally adjacent frame images, a previous time frame and a current time frame, are compressed in round-off and averaging techniques. Next, according to the compressed data of two corresponding pixels of the two frame images, whether or not the pixel of the current time frame image is of a motion picture is detected. If the pixel is of a motion picture, the compressed pixel data of the previous time frame image is decompressed, and an overdrive process is performed on the decompressed pixel data and the original pixel data of the current time frame image to produce an overdrive output. If the pixel is not of a motion picture, an overdrive process is not performed.

1 Claim, 2 Drawing Sheets

IMAGE PROCESSING METHOD FOR A TFT LCD

RELATED APPLICATIONS

The present application is a divisional of application Ser. No. 10/963,636 filed Oct. 14, 2004, and claiming priority from Taiwan Application Number 93111657 filed Apr. 26, 2004, the disclosures of which are hereby incorporated by reference herein in their entirety.

RELATED APPLICATIONS

The present application is based on, and claims priority from, Taiwan Application Serial Number 93111657, filed Apr. 26, 2004, the disclosure of which is hereby incorporated by reference herein its entirety.

BACKGROUND OF THE INVENTION

1. Field of the Invention

The present invention relates to an image processing method for a display device. More particularly, the present invention relates to an image compression method, an image decompression method, and a motion picture detection method for a thin film transistor liquid crystal display device (TFT LCD).

2. Description of Related Art

In the past few years, LCD devices have been widely used to replace traditional cathode-ray tube (CRT) display devices. Presently, due to the development and progress of TFT technology, using a TFT as an image pixel of an LCD has become very popular. FIG. 1 illustrates a normal process for processing an image for a TFT LCD. With reference to FIG. 1, input images from an image source 100 are transmitted through a transmission channel 104, and then the images are processed, which is represented by an image processing 108 rectangle in FIG. 1. A frame memory 112 is used to store the images and the images are later retrieved therefrom to continue processing and then be displayed on a TFT LCD 116.

However, the response time of liquid crystal molecules of an LCD for displaying motion pictures is generally slow. To improve (shorten) the response time of TFT LCD devices, image pixels of a motion picture are commonly processed with overdrive technology. In general, motion pictures are displayed at a rate of about a time frame per 16 ms (millisecond). When motion pictures are continuously displayed, the image pixel information of the previous time frame should usually be stored and compared with that of the current time frame in order to determine the scale of overdrive, and this also requires a frame memory buffer to support the storage and retrieval of image pixels.

However, storing all image pixels in a complete time frame requires a large frame memory buffer, particularly for a large TFT LCD panel with high resolution. Also, the concurrent storage and retrieval of image pixels utilizing the frame memory requires a very high bandwidth bus to access the frame memory, and this makes it difficult to implement the bus interface and induces significantly high electromagnetic interference (EMI) in the TFT LCD panel.

In order to reduce the size of the frame memory and solve the problem of high EMI, image compression methods, such as discrete cosine transform (DCT) algorithm or hierarchical vector quantization method, are often employed. Image compression based on DCT algorithm or vector quantization method may create some artifacts, which degrade the video pictures with artificial text or graphical patterns, and thus still require image compression with higher resolution for fine details.

In another respect, the overdrive for response time improvement should be activated only when the given images are motion pictures. Because the image source may itself be noisy or the images may be transmitted through an unreliable transmission channel easily coupled with noise, still pictures may also be treated as motion pictures, so that the overdrive intended to improve the response time for motion pictures may lead to noise amplification for still images with unpleasant visual effects.

SUMMARY OF THE INVENTION

Therefore an objective of the present invention is to provide an image compression method and an image decompression method for a TFT LCD, to reduce the amount of image data to be stored in and retrieved from the frame memory, thereby effectively reducing the size of the frame memory and EMI level.

Another objective of the present invention is to provide a motion detection method for a TFT LCD, to ensure that the overdrive is enabled only for motion pictures, thereby avoiding noise amplification in still pictures.

Still another objective of the present invention is to provide an image compression method and an image decompression method for a TFT LCD, to simplify the operations of image compression and decompression, so as to reduce the hardware design complexity and therefore make the whole system more cost effective.

Yet another objective of the present invention is to provide a motion detection method for a TFT LCD, to improve the performance of the overdrive, and therefore the performance of image processing.

Yet another objective of the present invention is to provide an image compression method, an image decompression method and a motion detection method for a TFT LCD, to increase the quality of image display and avoid side effects of image picture degradation as generally produced by mismatches between the original image pictures and decompressed image pictures.

In accordance with the foregoing and other objectives of the present invention, an image compression method for a TFT LCD is provided. An image is divided into a plurality of pixels, signals representing the plurality of pixels of the image are converted into RGB form data, and the RGB form data are converted into YUV form data. The method includes the following steps. The U components and the V components of the plurality of pixels are averaged respectively, to obtain a same Ua component and a same Va component for the plurality of pixels; the Y component, the Ua component and the Va component thereby form YUaVa data. In addition, the Y component is represented by B0 bits, the U component is represented by B1 bits, and the V component is represented by B2 bits. Next, the YUaVa data of the plurality of pixels are transformed into YmUmVm form data. The Ym component is represented by B3 bits, the Um component is represented by B4 bits, and the Vm component is represented by B5 bits. B3 is smaller than B0, B4 is smaller than B1, and B5 is smaller than B2. The Ym component is equal to the integer quotient when the Y component plus 2 to the power of (B0−B3−1) is divided by 2 to the power of (B0−B3). The Um component is equal to the integer quotient when the Ua component plus 2 to the power of (B1−B4−1) is divided by 2 to the power of (B1−B4). The Vm component is equal to the integer quotient when the Va component plus 2 to the power of (B2−B5−1) is divided by 2 to the power of (B2−B5).

In accordance with the foregoing and other objectives of the present invention, an image decompression method for a TFT LCD is provided. An image is divided into a plurality of pixels. The compressed YmUmVm form data of each pixel of a first time frame image, called YpUpVp data, are produced. The Yp component is represented by B3 bits, the Up component is represented by B4 bits, and the Vp component is represented by B5 bits. The compressed YmUmVm form data of each pixel of a second time frame image, called YcUcVc data, are also produced. The second time is later than the first time, and the two frame images are temporally adjacent. The method is performed by comparing the YpUpVp data and the YcUcVc data of two corresponding pixels of the first time frame image and the second time frame image, and then transforming the YpUpVp data into YdUdVd data. The Yd component is represented by B0 bits, the Ud component is represented by B1 bits, and the Vd component is represented by B2 bits. B3 is smaller than B0, B4 is smaller than B1, and B5 is smaller than B2.

When the Yp component is larger than the Yc component, the Yd component is equal to the Yp component multiplied by 2 to the power of (B0-B3), plus 2 to the power of (B0−B3) and minus 1; otherwise, the Yd component is equal to the Yp component multiplied by 2 to the power of (B0−B3). When the Up component is larger than the Uc component, the Ud component is equal to the Up component multiplied by 2 to the power of (B1−B4), plus 2 to the power of (B1−B4) and minus 1; otherwise, the Ud component is equal to the Up component multiplied by 2 to the power of (B1−B4). When the Vp component is larger than the Vc component, the Vd component is equal to the Vp component multiplied by 2 to the power of (B2−B5), plus 2 to the power of (B2−B5) and minus 1; otherwise, the Vd component is equal to the Vp component multiplied by 2 to the power of (B2−B5).

In accordance with the foregoing and other objectives of the present invention, a method of detecting a motion image for a TFT LCD is provided. An image is divided into a plurality of pixels. The compressed YmUmVm form data of a pixel of a first time frame image, called YpUpVp data, and the compressed YmUmVm form data of a pixel of a second time frame image, called YcUcVc data, are produced. The positions of the two pixels on the two frame images correspond, the second time is later than the first time, the two frame images are temporally adjacent, and the second time frame image is a current time input frame image. The method is performed by computing a first difference between the Yp component and the Yc component, a second difference between the Up component and the Uc component, and a third difference between the Vp component and the Vc component representing the two corresponding pixels of the first time frame image and the second time frame image, then comparing the first difference with a first threshold, the second difference with a second threshold, and the third difference with a third threshold, and when at least one of the first difference, the second difference, and the third difference is larger than the first threshold, the second threshold, and the third threshold respectively, judging the pixel of the two corresponding pixels that is of the second time frame image to be of a motion picture. Otherwise when none of the first difference, the second difference, and the third difference is larger than the first threshold, the second threshold, and the third threshold, respectively, the pixel of the two corresponding pixels that is of the second time frame image is judged to be of a still picture.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
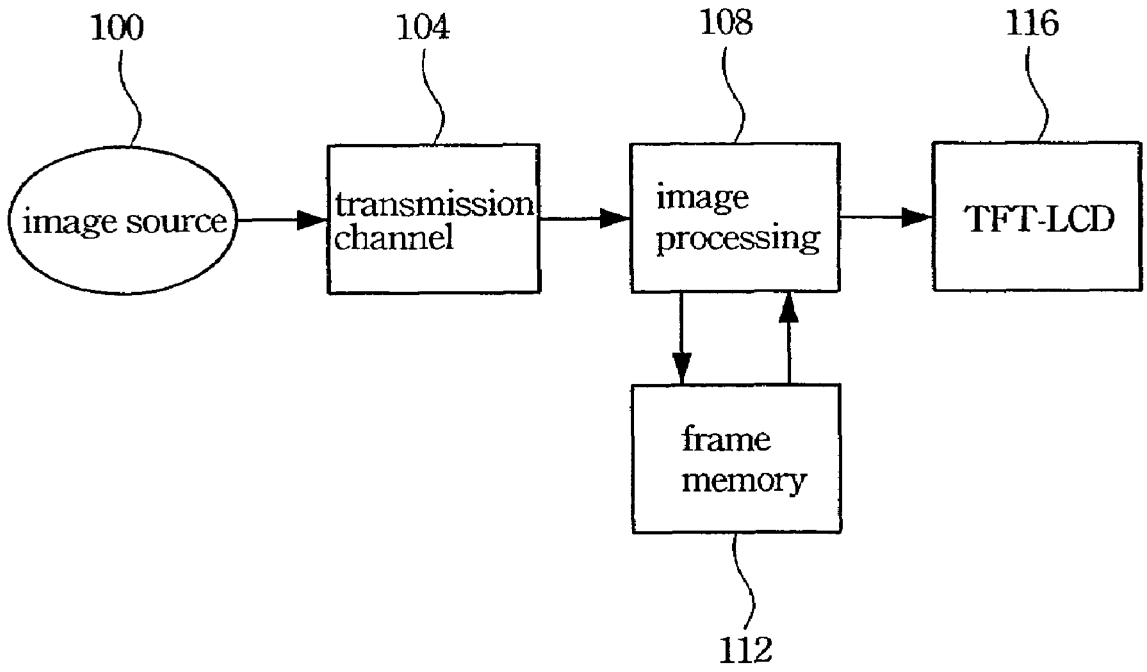
Fig. 1 (PRIOR ART)
FIG. 1 illustrates a normal process for processing an image for a TFT LCD.
Figure 2:
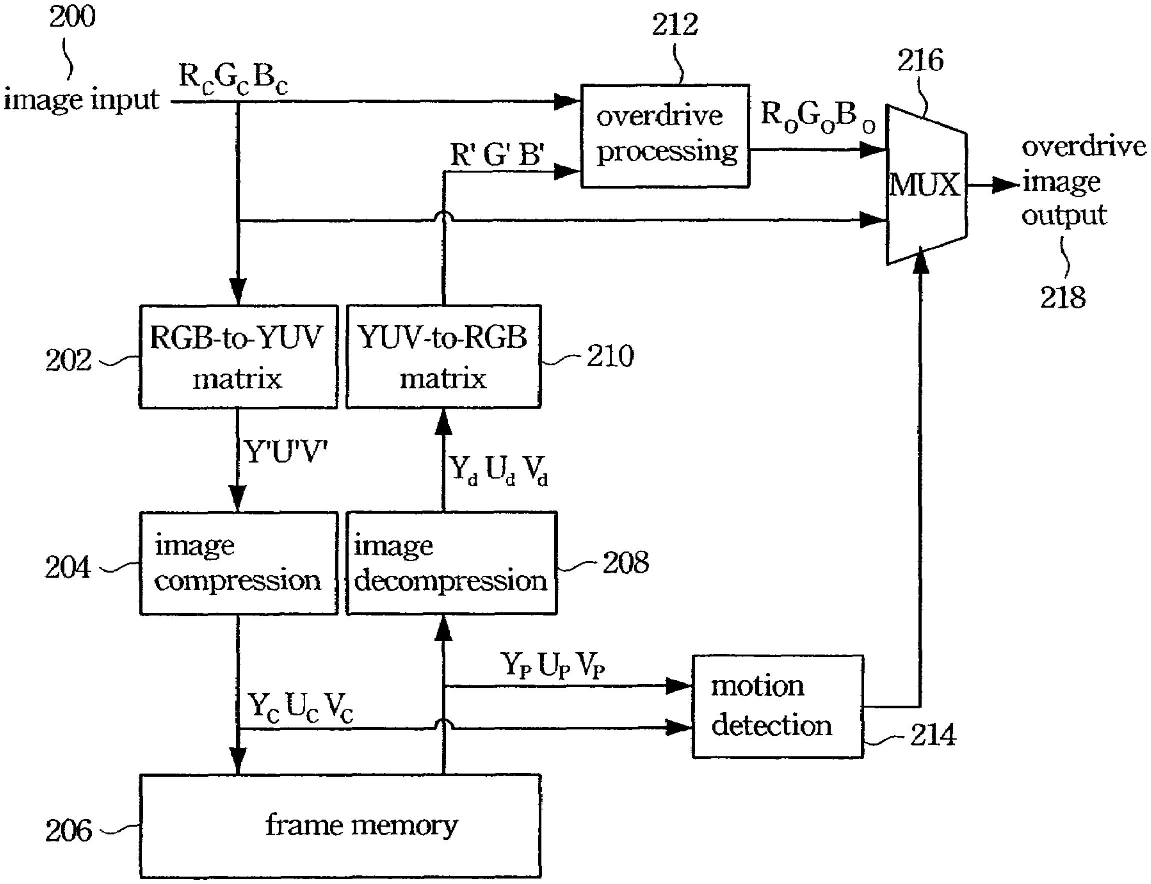
FIG. 2 illustrates a process of image processing for a TFT LCD according to a preferred embodiment of the invention.

The present invention provides an image compression method, an image decompression method and a motion detection method for a TFT LCD. FIG. 2 illustrates a process of image processing for a TFT LCD according to a preferred embodiment of the invention. It is assumed that each image picture of each time frame is constructed of many sub-blocks and each sub-block has M×N image pixels. M is the width number of image pixels of the sub-block, and N is the height number of image pixels of the sub-block. The following discussion is mainly directed to a sub-block as an image unit.

As shown in FIG. 2, image compression 204, image decompression 208, and motion detection 214 mechanisms are added such that the performance of the overdrive is improved. The incoming image input 200 contains consecutive time frame images. Each time frame image is discussed herein using one sub-block as an example. It is assumed that a previous time frame image is a first time frame image, a current time frame image is a second time frame image, and the two frame images are temporally adjacent. Using a sub-block of the second time frame image as an example, signals representing each image pixel of the sub-block are first converted into RGB (Red Green Blue) form data, called RcGcBc (c represents current) data. Next, the RcGcBc data is converted into YUV form data, called Y'U'V' data, using, for example, an RGB-to-YUV matrix 202. The Y component of the YUV form data is the luminance component, and the U and V components are the chrominance components. It is also assumed that the Rc component is represented by B0 bits (called the color depth), the Gc component is represented by B1 bits, and the Bc component is represented by B2 bits. Therefore the Y', U' and V' components are, for example, represented by B0, B1 and B2 bits, respectively.

Image Compression Method

Next, the Y'U'V' image data undergoes image compression 204. The detailed procedure is to average the U' components and V' components of all the M×N image pixels of the sub-block of the second time frame image, respectively, to obtain a Ua component and a Va component for every one of the M×N image pixels, as shown in equations (1) and (2). Therefore the Y' component of each pixel, the Ua component and the Va component constitute Y'UaVa data.

$$Ua = \left[\sum_{i=1}^{M}\sum_{j=1}^{N} U'(i,j)\right] \Big/ (M \times N)(i = 1 \text{ to } M,\ j = 1 \text{ to } N) \tag{1}$$

$$Va = \left[\sum_{i=1}^{M}\sum_{j=1}^{N} V'(i,j)\right] \Big/ (M \times N)(i = 1 \text{ to } M,\ j = 1 \text{ to } N) \tag{2}$$

The averaging step is performed due to the fact that the difference in each of the chrominance components (including the U' and V' components) of adjacent pixels in the sub-block is small. Therefore a single average value can be used to approximately represent all pixels, eliminating the need to store the different U' and V' components of all pixels in the sub-block. The purpose of data amount reduction by image compression is thus achieved.

In addition, the Y'UaVa data representing the sub-block of the second time frame image can be further compressed. Because the difference in the luminance component (the Y' component) of adjacent pixels in the sub-block is relatively large, the averaging step is not performed on the Y' component. The step of further compressing the Y'UaVa data representing the sub-block of the second time frame image is to transform the YUaVa data into YmUmVm form data, called YcUcVc data. The Yc component is represented by B3 bits, the Uc component is represented by B4 bits, and the Vc component is represented by B5 bits. B3 is smaller than B0, B4 is smaller than B1, and B5 is smaller than B2, so as to achieve the data reduction result of image compression. The arithmetic operations are that the Yc component is equal to the integer quotient when the Y' component plus 2 to the power of (B0−B3−1) is divided by 2 to the power of (B0−B3), the Uc component is equal to the integer quotient when the Ua component plus 2 to the power of (B1−B4−1) is divided by 2 to the power of (B1−B4), and the Vc component is equal to the integer quotient when the Va component plus 2 to the power of (B2−B5−1) is divided by 2 to the power of (B2−B5), as shown in equations (3), (4) and (5).

$$Yc(i,j)=[Y'(i,j)+2^{(B0-B3-1)}]/2^{(B0-B3)} \quad (3)$$

(i=1 to M, j=1 to N)

$$Uc=[Ua+2^{(B1-B4-1)}]/2^{(B1-B4)} \quad (4)$$

$$Vc=[Va+2^{(B2-B5-1)}]/2^{(B2-B5)} \quad (5)$$

The further compression step described above is a round off technique. For example, when the Yc component is represented by 3 (B3 is 3) bits and the Y' component is represented by 6 (B0 is 6) bits, performing the operation according to equation (3) first removes 3 (equal to B0 minus B3) least significant bits of the Y' component and then whether 1 is added to the remaining bits of the Y' component or not depends on the remainder left after the division in equation (3); thereby, the 3-bit integer quotient resulting from the division in equation (3), the Yc component, is obtained. When the remainder is smaller than a half (equal to 4) of 2 to the power of (B0−B3) (equal to 8), 1 must be added to the remaining bits of the Y' component to obtain the Yc component; otherwise, when the remainder is not smaller than a half of 2 to the power of (B0−B3), the remaining bits of the Y' component are the Yc component. For example, when the Y' component is 001000 (equal to the decimal number 8), the 3-bit integer quotient resulting from the division in equation (3) is 001, and the remainder is 4. Since the remainder 4 is not smaller than a half (equal to 4) of 2 to the power of 3, 1 is not added to the remaining bits of the Y' component after 3 least significant bits (000) are removed from the Y' component. The remaining bits of the Y' component are the result 001 of the operation, the Yc component. The operations for obtaining the Uc component and the Vc component are also the round off technique described above.

During the second time frame image, all sub-blocks in the second time frame are compressed to obtain YcUcVc data, and these YcUcVc data are stored in a frame memory 206. The frame memory 206 is, for example, a synchronous dynamic random access memory (SDRAM). As far as a sub-block is concerned, the number of bits needing to be stored after compression is only (B3×M×N+B4+B5), since all M×N pixels have the same Uc component and the same Vc component.

Image Decompression Method

Still referring to FIG. 2, the image decompression method for a TFT LCD of the invention is described now. It is to be understood that the compressed YmUmVm form data representing the sub-block of the first time frame image, called YpUpVp (p represents previous) data, has already been produced, for example, according to the above-mentioned image compression method, and stored in the frame memory 206. The Yp component is represented by B3 bits, the Up component is represented by B4 bits, and the Vp component is represented by B5 bits.

During the second time frame image, the compressed YmUmVm form data representing the sub-block of the second time frame image, called YcUcVc (c represents current) data, are also produced, for example, according to the above-mentioned image compression method, while the compressed YpUpVp data of all sub-blocks in the first time frame are retrieved from the frame memory 206, and then undergo image decompression 208. To perform the decompression, the YpUpVp data and the YcUcVc data of two corresponding pixels of the first time frame image and the second time frame image are first compared, and then the YpUpVp data are transformed into YdUdVd data. The Yd component is represented by B0 bits, the Ud component is represented by B1 bits, and the Vd component is represented by B2 bits. B3 is smaller than B0, B4 is smaller than B1, and B5 is smaller than B2.

The way in which the YpUpVp data are transformed into the YdUdVd data is described now. To improve the response time characteristic, that is, to shorten the response time of the liquid crystal molecules, when the Yp component is larger than the Yc component, meaning the Yp component representing the pixel of the sub-block of the previous time frame image is larger than the Yc component representing the corresponding pixel of the sub-block of the current time frame image, least significant bits of 1 are restored during the decompression, the arithmetic operation of which is that the Yd component is equal to the Yp component multiplied by 2 to the power of (B0−B3), plus 2 to the power of (B0−B3) and minus 1, as shown in equation (6). Otherwise (the Yp component is not larger than the Yc component), least significant bits of 0 are restored during the decompression, the arithmetic operation of which is that the Yd component is equal to the Yp component multiplied by 2 to the power of (B0−B3), as shown in equation (7). The number of least significant bits restored is (B0−B3). For example, when the Yp component is 010 (B3 is 3), the Yc component is 001, and the Yd component after decompression is represented by 6 bits (B0 is 6), since the Yp component is larger than the Yc component, performing the operation according to equation (6) restores 3 (equal to B0 minus B3) least significant bits of 1 to the Yp component.

If the Yp component is larger than the Yc component, $$Yd(i,j)=Yp(i,j)\times 2^{(B0-B3)}+2^{(B0-B3)} \quad (6)$$

otherwise $$Yd(i,j)=Yp(i,j)\times 2^{(B0-B3)} \quad (7)$$

(i=1 to M, j=1 to N)

Similarly, when the Up component is larger than the Uc component, the Ud component is equal to the Up component multiplied by 2 to the power of (B1−B4), plus 2 to the power of (B1−B4) and minus 1, as shown in equation (8); otherwise, the Ud component is equal to the Up component multiplied by 2 to the power of (B1−B4), as shown in equation (9). When the Vp component is larger than the Vc component, the Vd component is equal to the Vp component multiplied by 2 to the power of (B2−B5), plus 2 to the power of (B2−B5) and minus 1, as shown in equation (10); otherwise, the Vd component is equal to the Vp component multiplied by 2 to the power of (B2−B5), as shown in equation (11).

If the Up component is larger than the Uc component, $$Ud(i,j)=Up\times 2^{(B1\text{-}B4)}+2^{(B1\text{-}B4)} \tag{8}$$

otherwise $$Ud(i,j)=Up\times 2^{(B1\text{-}B4)} \tag{9}$$

(i=1 to M, j=1 to N)

If the Vp component is larger than the Vc component, $$Vd(i,j)=Vp\times 2^{(B2\text{-}B5)}+2^{(B2\text{-}B5)} \tag{10}$$

otherwise $$Vd(i,j)=Vp\times 2^{(B2\text{-}B5)} \tag{11}$$

(i=1 to M, j=1 to N)

When the YpUpVp data are being transformed into the YdUdVd data, the method of detecting motion pictures may be performed.

Motion Picture Detection Method

Still referring to FIG. 2, the motion detection 214 method used in the embodiment is described now. The motion detection step is pixel-based. The method is performed by first computing a first difference ΔY between the Yp component and the Yc component, a second difference ΔU between the Up component and the Uc component, and a third difference ΔV between the Vp component and the Vc component representing two corresponding pixels of two temporally adjacent frame images, for example the first time frame image and the second time frame image, as shown in equation (12). It has already been mentioned that the second time frame image is the current time input frame image. The computing step must be done for each pair of corresponding pixels of the two temporally adjacent frame images. The three differences ΔY, ΔU, and ΔV may be absolute value differences.

$$\Delta Y=|Yc-Yp|\Delta U=|Uc-Up|\Delta V=|Vc-Vp| \tag{12}$$

Next, the first difference ΔY is compared with a first threshold Ty, the second difference ΔU with a second threshold Tu, and the third difference ΔV with a third threshold Tv. The standard for detecting motion pictures is that when at least one of the first difference ΔY, the second difference ΔU, and the third difference ΔV is larger than the first threshold Ty, the second threshold Tu, and the third threshold Tv respectively, as shown in equation (13), the pixel of the two corresponding pixels that is of the second time frame image, which is the current time input frame image, is judged to be of a motion picture.

$$(\Delta Y>Ty)\text{or}(\Delta U>Tu)\text{or}(\Delta V>Tv) \tag{13}$$

Since the overdrive is generally performed on RGB form data, after judging that the pixel of the two corresponding pixels is of a motion picture, it is common practice to process the YdUdVd data by a YUV-to-RGB matrix 210 in order to produce RGB form data representing the pixel of the two corresponding pixels that is of the first (previous) time frame image, called R'G'B' data. Next, an overdrive processing 212, performed by, for example, using a look-up table, between the two corresponding pixels is performed on the RcGcBc data and the R'G'B' data of the two corresponding pixels to obtain the R component, G component and B component after overdriving, called RoGoBo data. The output RoGoBo data and the RcGcBc data representing the pixel of the second time frame image then enter a multiplexer (MUX) 216, and the result that the pixel of the second time frame image is judged to be of a motion picture drives the multiplexer 216 to pass the RoGoBo data as an overdrive image output 218.

Alternatively, when none of the first difference ΔY, the second difference ΔU, and the third difference ΔV is larger than the first threshold Ty, the second threshold Tu, and the third threshold Tv respectively, the pixel of the two corresponding pixels that is of the second time frame image is judged to be of a still picture, therefore an overdrive is not performed, and the multiplexer 216 outputs the RcGcBc data representing the pixel of the second time frame image. Furthermore, the first threshold Ty, the second threshold Tu, and the third threshold Tv may be configured to adapt to image inputs under different noise conditions. The output of the multiplexer 216 is provided to a TFT LCD device for display.

All the three methods described above can be collectively regarded as an image processing method for a TFT LCD. An image is divided into a plurality of pixels. The image processing method is performed by first converting signals representing a pixel of a first time frame image into RGB form data, and converting signals representing a pixel of a second time frame image into RGB form data, called RcGcBc data, in which the positions of the two pixels on the two frame images correspond, the second time is later than the first time, the two frame images are temporally adjacent, and the second time frame image is the current time input frame image. The RGB form data representing the two pixels are then transformed into YUV form data. Next, the YUV form data of the pixel of the first time frame image are compressed into YmUmVm form data, called YpUpVp data, and the YUV form data of the pixel of the second time frame image are compressed into YmUmVm form data, called YcUcVc data. The compression steps are performed, for example, according to the image compression method described above. Next, whether the pixel of the second time frame image is of a motion picture is determined. This step of determining is performed, for example, according to the motion picture detection method described above. When the pixel of the second time frame image is judged to be of a motion picture, the YpUpVp data and the YcUcVc data of the two corresponding pixels are compared, the YpUpVp data are decompressed into YdUdVd data, then the YdUdVd data are transformed into RGB form data, called R'G'B' data, and an overdrive process is performed on the RcGcBc data and the R'G'B' data representing the two corresponding pixels to produce RoGoBo data as an output. Otherwise, when the pixel of the second time frame image is judged to be not of a motion picture, the RcGcBc data are provided as an output. The decompression step is performed, for example, according to the image decompression method described above.

Advantages of the present invention include the following. Using the image compression method of the present invention can reduce the amount of image data to be stored in and retrieved from the frame memory, and therefore can effectively reduce the size of the frame memory, the bandwidth of the bus and the EMI level. Another advantage is that the image compression and decompression methods of the present invention can simplify the operations of image compression and decompression, so as to reduce the hardware design complexity and therefore make the whole system more cost effective. In addition, employing the motion detection method of the present invention can ensure that the overdrive is enabled only for motion pictures, thereby avoiding noise amplification in still pictures. As a result, the motion detection method also improves the performance of the overdrive such that the response time is further shortened, and therefore the performance of image processing is improved. As a whole, the image compression, image decompression and motion detection methods can increase the quality of image display and avoid side effects of image picture degradation generally produced by the mismatches between the original image pictures and decompressed image pictures.

Although the present invention has been described in considerable detail with reference to certain preferred embodiment thereof, other embodiments are possible. Therefore, the spirit and scope of the appended claims should no be limited to the description of the preferred embodiments contained herein.

What is claimed is:

1. A method of detecting a motion image for a TFT LCD, an image being divided into a plurality of pixels, said method comprising:

converting signals representing a pixel of a first time frame image into RGB form data, and converting signals representing a pixel of a second time frame image into RGB form data, called RcGcBc data, wherein positions of said two pixels on said two frame images correspond, said second time is later than said first time, said two frame images are temporally adjacent, and said second time frame image is a current time input frame image;

transforming said RGB form data representing said two pixels into YUV form data;

compressing said YUV form data of said pixel of said first time frame image into YmUmVm form data, called YpUpVp data, and compressing said YUV form data of said pixel of said second time frame image into YmUmVm form data, called YcUcVc data;

computing a first difference between said Yp component and said Yc component, a second difference between said Up component and said Uc component, and a third difference between said Vp component and said Vc component representing said two corresponding pixels of said first time frame image and said second time frame image; and comparing said first difference with a first threshold, said second difference with a second threshold, and said third difference with a third threshold, and when at least one of said first difference, said second difference, and said third difference is larger than said first threshold, said second threshold, and said third threshold, respectively, judging the pixel of said two corresponding pixels that is of said second time frame image to be of a motion picture, wherein when none of said first difference, said second difference, and said third difference is larger than said first threshold, said second threshold, and said third threshold, respectively, further judging the pixel of said two corresponding pixels that is of said second time frame image to be of a still picture; and outputting, using a multiplexer, wherein when said pixel of said second time frame image is judged to be of a motion picture, comparing said YpUpVp data and said YcUcVc data of said two corresponding pixels, decompressing said YpUpVp data into YdUdVd data, then transforming said YdUdVd data into RGB form data, called R'G'B' data, and performing an overdrive processing on said RcGcBc data and said R'G'B' data of said two corresponding pixels to produce RoGoBo data, and the multiplexer outputs the RoGoBo data, and wherein when said pixel of said second time frame image is judged to be not of a motion picture, the multiplexer outputs the RcGcBc data.

* * * * *